United States Patent [19]

Lim et al.

[11] Patent Number: 4,536,554
[45] Date of Patent: Aug. 20, 1985

[54] HYDROPHILIC POLYMERS AND CONTACT LENSES MADE THEREFROM

[75] Inventors: Drahoslav Lim; Chidambar L. Kulkarni; Dennis A. Repella, all of San Diego, Calif.

[73] Assignee: Barnes-Hind, Inc., Sunnyvale, Calif.

[21] Appl. No.: 582,362

[22] Filed: Feb. 22, 1984

[51] Int. Cl.$^3$ .................... C08F 226/10; G03B 21/46
[52] U.S. Cl. ................................ 526/264; 351/160 R; 351/160 H; 523/106; 523/108; 526/258
[58] Field of Search ...................... 526/258, 264, 269; 523/106, 108; 351/160 R, 160 H

[56]  References Cited
U.S. PATENT DOCUMENTS

| | | | |
|---|---|---|---|
| 3,267,084 | 8/1966 | Rankin et al. | 525/387 |
| 3,647,736 | 3/1972 | Ewell | 523/108 |
| 3,985,697 | 10/1976 | Urbach | 523/106 |
| 4,430,458 | 2/1984 | Tighe et al. | 523/108 |

*Primary Examiner*—Harry Wong, Jr.

[57] ABSTRACT

An interpenetrating network polymer is obtained by mixing hydrophilic monomer vinyl pyrrolidone and hydrophobic monomer (5-alkylene-m-dioxanyl) acrylic ester in the presence of at least two crosslinking agents and, optionally, hydroxyalkyl acrylic ester and catalysts and causing polymerization to occur. Contact lenses made from the polymer have high tensile strength and can absorb a high degree of water.

6 Claims, No Drawings

HYDROPHILIC POLYMERS AND CONTACT LENSES MADE THEREFROM

This invention relates to transparent optically clear interpenetrating network polymers suitable for manufacturing contact lenses, and particularly to such polymers that have been prepared with modifiers and crosslinking agents, and the method of preparation of the modified, crosslinked, optically transparent interpenetrating network polymers.

It is known that certain hydrophilic gel contact lenses of high water content have oxygen permeability which are order of magnitude greater than conventional polymethylmethacrylate lenses and provide sufficient amounts to cornea for its metabolic needs. The increased oxygen permeability makes possible increased wearing time with increased comfort and absence of most of the undesirable physiological symptoms resulting from the conventional lens wearing.

In order to optimize the foregoing advantages of these hydrophilic lenses, materials with high water content are desired. However, previously the strength of lenses with very high water content have been found to be low in tensile strength and having tear resistance which decreases progressively with the increase in water content. Such lenses are very fragile and are not very durable. In some instances such contact lenses can only be inserted and removed by a professional practitioner because of their fragility. Such polymers are found in the following patents. Brit. Pat. Nos. 1,391,438 and 1,475,605; U.S. Pat. Nos. 3,639,524, 3,721,657, and 3,943,045.

In some hydrophilic polymers, acrylic or methacrylic acid is one of the components used to increase its hydrophilicity. Such polymers are described in the following patents: Canadian Pat. No. 1,132,738; U.S. Pat. No. 4,361,657; U.S. Pat. No. 4,347,198. The addition of acid introduces a negative charge in the polymers due to the carboxylic functional group which in turn increases the affinity for tear proteins and other oppositely charged particles, thus resulting in excessive soiling of the contact lenses made from such polymers. These lenses tend to lose their optical clarity rather quickly.

Additionally, practically all, if not all, commercially available soft contact lenses that could be considered for extended wear employ HEMA (2-hydroxyethylmethacrylate) in composition with other monomers of high hydrophilicity, methacrylic acid, acrylic acid and N-vinyl-2-pyrrolidone. The group of lenses using highly hydrophilic monomers face several important problems. Mechanical strength of these high water content copolymers is inferior and the lens, in order to withstand handling has to be made thick. Since oxygen transport is related to membrane thickness, the advantage of high water content is cancelled or impaired by the thickness.

It would be desirable to provide hydrophilic polymers and contact lenses made therefrom which are of high water content, high strength, good durability, high oxygen permeability, and which resist soiling due to tear proteins.

The object of the present invention is to prepare crosslinked hydrophilic neutral interpenetrating network polymers, with high water content, good tensile strength, tear resistance and very low affinity for tear proteins and other contaminants, and which may be used to fabricate contact lenses, especially soft contact lenses for extended wear.

It has now been found that this object of the invention can be obtained by the preparation of novel water swellable, water insoluble interpenetrating network polymers and the manufacture of a hydrophilic contact lens therefrom.

The novel polymers are prepared by polymerization of monomers comprised of hydrophilic monomer vinyl pyrrolidone and hydrophobic monomer (5-alkylene-m-dioxanyl) acrylic ester in the presence of minor amounts of at least two crosslinking agents. At least one of the crosslinking agents has an affinity for the hydrophilic monomer and at least one has an affinity for the hydrophobic monomer. Minor amounts of hydroxyalkyl acrylic ester are optionally added for control of elasticity of hydrated polymer.

The resulting modified and crosslinked polymers are insoluble in water or aqueous body fluids. They are clear or transparent and flexible or rubbery or stiff depending upon the amounts and types of modifiers and crosslinking agents used. The physical properties of the resins or polymers of the invention are controlled by adjusting the ratios of the modifier and the crosslinking agent to the amount of the total vinyl amide used in the reaction mixture.

In its broadest definition, an interpenetrating polymer network, IPN, is any material containing two polymers each in network form. A practical restriction requires that the two polymers have been synthesized and/or crosslinked in the immediate presence of each other. There are three major types of IPNs.

1. The sequential IPN begins with the synthesis of a crosslinked polymer I. Monomer II, plus its own crosslinker and initiator, are swollen into polymer I, and polymerized in situ.

2. Simultaneous interpenetrating networks, SINs, begin with a mutual solution of monomers and their respective crosslinkers, which are then polymerized simultaneously by non-interfering modes, such as stepwise and chain polymerizations.

3. A third mode of IPN synthesis takes two latexes of linear polymers, mixes and coagulates them and crosslinks both components simultaneously. The product called an interpenetrating elastomeric network, IEN.

There are, in fact, many different ways that an IPN can be prepared; each yields a distinctive topology.

The interpenetrating network polymer of the present invention belongs to the second type, namely, simultaneous interpenetrating networks, SIN.

An IPN can be distinguished from simple polymer blends, blocks, and grafts in two ways:

1. An IPN swells, but does not dissolve in solvents.
2. Creep and flow are suppressed.

Most IPNs phase separate to a greater or lesser extent. In the present invention, the monomers have been crosslinked with specific crosslinkers, therefore the resulting IPNs tend to develop two homogeneously continuous phases. This aspect provides the IPNs with excellent mechanical properties.

The major component of the polymer is a hydrophilic vinylpyrrolidone, preferred is n-vinyl-2-pyrrolidone.

The vinyl pyrrolidone will normally be present in an amount of 50–80%, preferably 58–65%, most preferably at about 63%. All percentages provided in this specification are by weight based on the total weight of monomers exclusive of crosslinking agents and optional catalysts.

The most important component for overall mechanical properties of the polymer is the hydrophobic monomer of a (5-alkylene-m-dioxanyl) acrylic ester which is disclosed in U.S. Pat. No. 3,267,084. This class of monomer has the formula

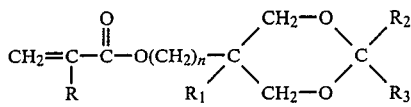

wherein
R and $R_1$ are independently H or $C_1$-$C_4$ alkyl,
$R_2$ and $R_3$ are independently H, $C_1$-$C_4$ alkyl, or phenyl, and
n is an integer from 1-4.

The most preferred is (5-methyl-5-m-dioxanyl)methyl methacylate. The hydrophobic monomer is present in the amount 10-45%, preferably 20-35%, most preferably 30-33% by weight.

Among the optional hydroxyalkyl acrylic esters which can be used in the invention are 2-hydroxyethyl methacylate (HEMA), 2-hydroxypropyl methacylate, and corresponding acrylates. HEMA is preferred.

However, other hydrophilic monomers such as N-methylmethacylamide, N,N-dimethylmethacylamide and N-(3-hydroxypropyl)methacrylamide can be used in place of HEMA.

This monomer is present in the amount 0-20%, preferably 5-10%, and most preferably 5-8% by weight.

It is contemplated that other monomers in minor amounts can be present in the polymer and still be within the scope of the present invention.

To obtain the interpenetrating network polymer of the present invention, the use of at least two crosslinking agents is required.

The first crosslinking agent must have an affinity for the vinyl pyrrolidone used. A suitable crosslinking agent is 3,3'-ethylidene-bis (N-vinyl-2-pyrrolidone), preferably, in the amount of 0.1-1.0%, more preferably in the amount of 0.3-0.5%.

However, other crosslinking agents which can be used include diallyl itaconate, diallyl maleate, diallyl fumarate, dimethallyl fumarate, dimethallyl maleate, diallyl diglycollate, diethylene glycol bis (allyl carbonate), diallyl oxalate, diallyl adipate, diallyl succinate, diallyl azelate, divinyl benzene, divinyl adipate, and divinylethers.

A second crosslinking agent is required having an affinity for 5-alkylene-m-dioxanyl acrylic esters and the optional hydroxylalkyl acrylic ester.

A preferred crosslinking agent is neopentyl glycol dimethacrylate present in the amount of 0.1-2.0%, preferably in the amount of 0.2-0.5%, more preferably 0.3-0.4%.

Other crosslinking agents which can be used include: ethylene glycol dimethacrylate, triethylene glycol dimethacrylate, tetraethylene glycol dimethacrylate, polyethylene glycol dimethacrylate, 1,6-hexane diol dimethacrylate, glycerol trimethacrylate, pentaerythritol trimethacrylate, pentaerythritol tetramethacrylate, trimethylol propane trimethyacrylate, allylmethacrylate, and corresponding acrylates.

Among the catalysts that can be used in preparing the polymers of the invention are organic peroxides such as benzoyl peroxide, lauryl peroxide, cumene hydroperoxide, dibutyl peroxide, etc. Other suitable catalysts are azobisisobutyronitrile, tertiary butyl peroxide, tertiary butyl hydroperoxide, initiator redox systems like ammonia plus hydrogen peroxide, and others. Catalysts that are harmless or non-injurious if left remaining in the products or resins, are preferred although the removal of these residues is done by extraction by hydration in large volumes of water or a continuous flow of water. The amount of catalysts employed generally ranges from 0 percent to about 2 percent of the reaction mixture. Certain compositions of the mixture require very little catalyst; others require a great deal more; and some give satisfactory resins with none. To speed up polymerization, an accelerator may be used, such as para-dimethyl-toluidine and others. Preferred catalysts are organic peroxides such as t-butyl-peroxyneodecanoate, t-butylperoctoate and t-butylperbenzoate in an amount ranging from 0.03 percent to 0.08 percent of the mixture.

The polymerization is generally carried out at temperatures from about room temperature to about 145° C. It is generally preferred to initiate the polymerization at relatively low temperatures such as from about 45° to 80° C. and then increase the temperature to about 110° to 130° C. as the reaction proceeds. Generally post-curing is done at about 140°-145° C.

Usually the polymerization is conducted under inert nitrogen atmosphere in order to exclude the oxygen of the atmosphere which has deteriorating effects on the formation of polymers of the invention.

Contact lenses are made by shaping the interpenetrating network polymer in the dry state using conventional and well known procedures and apparatus and thereafter hydrating the dry lens to the final configuration.

The interpenetrating network polymers which can be obtained in the present invention exhibit good mechanical properties and resist tear protein deposition. Also the hydrated polymers may be elastic and flexible or may be rigid depending upon the relative amounts of specific monomer employed.

The following examples are presented to illustrate the invention. The hydrophobic monomer (5-methyl-5-m-dioxanyl) methyl methacrylate was made according to the general procedure described in U.S. Pat. No. 3,267,084 with some modifications. One of the crosslinkers, 3,3'-ethylidene bis (N-vinyl-2-pyrrolidone), was made by the general method described in British Pat. No. 1,024,400.

EXAMPLE 1

A polymerization mixture was prepared by mixing 96 parts vinyl-2-pyrrolidone, 56 parts (5-methyl 5-m-dioxanyl) methylmethacrylate, 8 parts HEMA, 0.64 parts 3,3'-ethylidene bis (N-vinyl-2-pyrrolidone), 0.48 parts neopentyl glycol dimethacrylate and organic peroxide initiators, 0.048 parts t-butyl peroxy neodecanoate, 0.048 parts t-butylperoctoate and 0.128 parts t-butylperbenzoate and then poured into polypropylene stationary molds. These molds were placed in a vacuum oven and evacuated. Then it was backfilled with nitrogen. This process was repeated two more times.

The copolymerization was effected by initially heating the mixture to about 40°-45° C. for about 2 hours. The copolymerization was then completed by heating for 6 hours at 80° C., 8 hours at 110° C. and then heating for another hour at 130° C. After the polymerization was completed, lens blanks were removed from the molds and were post-cured at 140°-145° C. for 6 hours under nitrogen atmosphere. The lens obtained was clear and had excellent mechanical and optical properties and had a water content of 65% at osmotic equilibrium.

The hydrogel had Young's modulus of $10.1 \times 10^6$ dynes/cm$^2$ and ultimate tensile strength of $10.1 \times 10^6$ dynes/cm$^2$.

EXAMPLE 2

26 parts N-vinyl-2-pyrrolidone, 12 parts (5-methyl-5-m-dioxanyl) methyl methacrylate, 2 parts HEMA, 0.24 parts 3,3'-ethyledine-bis (N-vinyl-2-pyrrolidone), 0.12 parts neopentyl glycol dimethacrylate, 0.012 parts t-butyl peroxy neodecanoate, 0.012 parts t-butylperoctoate and 0.08 parts t-butyl-perbenzoate were mixed and then poured into the polypropylene circular molds and polymerized as described in Example 1.

The lens obtained was clear, flexible and elastic and had excellent optical properties and had a water content of about 70% at osmotic equilibrium.

EXAMPLE 3

28 parts of N-vinyl-2-pyrrolidone, 4 parts (5-methyl-5-m-dioxanyl) methyl methacrylate, 8 parts HEMA, 0.26 parts 3,3'-ethylidene-bis (N-vinyl-2-pyrrolidone), 0.1 parts neopentyl glycol dimethacrylate, 0.012 parts t-butyl-peroxy neodecanoate, 0.012 parts t-butyl peroctoate and 0.08 t-butyl perbenzoate were mixed and then poured into the polypropylene circular molds and polymerized as described in Example 1, except that the heating cycle was as follows. Initially, the mixture was heated at 40° C. for 19 hours. Then, the polymerization was completed by heating for 2 hours at 80° C., 5 hours at 110° C., and 1.5 hours at 130° C.

The lens obtained was clear, flexible and elastic and had excellent optical properties and had a water content of about 74.5% at osmotic equilibrium.

EXAMPLE 4

22 parts N-vinyl-2-pyrrolidone, 16 parts (5-methyl-5-m-dioxanyl) methyl methacrylate, 2 parts HEMA, 0.2 parts 3,3'-ethylidene-bis (N-vinyl-2-pyrrolidone), 0.15 parts neopentyl glycol dimethacrylate, 0.016 parts t-butyl peroxy neodecanoate, 0.016 parts t-butyl peroctoate, and 0.032 parts t-butyl perbenzoate were mixed and then poured into the polypropylene circular molds and polymerized as described in Example 1.

The lens obtained was clear, flexible and elastic and had a water content of about 61.1% at osmotic equilibrium.

The hydrogel had Young's molulus of $42.9 \times 10^6$ dynes/cm$^2$ and ultimate tensile strength of $18 \times 10^6$ dynes/cm$^2$.

EXAMPLE 5

12 parts N-vinyl-2-pyrrolidone, 5 parts (5-methyl-5-m-dioxanyl) methylmethacrylate, 3 parts HEMA, 0.08 parts 3,3'-ethylidene-bis(N-vinyl-2-pyrrolidone), 0.08 parts neopentyl glycol dimethacrylate, 0.016 par t-butyl peroxy neodeconoate, and 0.016 parts t-butyl peroctoate were mixed and then poured into the polypropylene circular molds and polymerized.

The copolymerization was effected by initially heating the mixture to about 50°-54° C. for 2 hours under nitrogen atmosphere and then heating was carried out at 87°-90° C. for 10 hours and 107°-110° C. for 2 hours.

The hydrogel lens was clear and had excellent optical properties and had a water content of about 69%.

EXAMPLE 6

24 parts N-vinyl-2-pyrrolidone, 12 parts (5-methyl-5-m-dioxanyl) methyl methacrylate, 4 parts HEMA, 0.16 parts 3,3'-ethylidene-bis(N-vinyl-2-pyrrolidone), 0.12 parts neopentyl glycol dimethacrylate, 0.012 parts t-butyl peroxy neodecanote, 0.012 parts t-butyl peroctoate and 0.032 parts t-butyl perbenzoate were mixed and then poured into polypropylene circular molds and polymerized under nitrogen atmosphere. The polymerization was effected by initially heating the mixture to about 45° C. for 3 hours. Then it was completed by heating for 6 hours at 83°-85° C., 10 hours at 110° C. and 1 hour at 130° C. After the polymerization had been completed, lens blanks were removed from the molds and were post cured at 140°-145° C. for 6 hours under nitrogen atmosphere.

The hydrogel lens obtained was clear and had excellent mechanical and optical properties and had a water content of 67.6%.

The hydrogel had Young's molulus of $7.64 \times 10^6$ dynes/cm$^2$ and ultimate tensile strength of $10.21 \times 10^6$ dynes/cm$^2$.

EXAMPLE 7

24.8 parts N-vinyl-2-pyrrolidone, 13.2 parts (5-methyl-5-m-dioxanyl)methyl methacrylate, 2 parts HEMA, 0.16 parts 3,3'ethylidene bis (N-vinyl-2-pyrrolidone), 0.12 parts neopentyl glycol dimethacrylate, 0.012 parts t-butyl peroxy neodecanoate, 0.012 parts t-butyl peroctoate, and 0.032 parts t-butyl perbenzoate were mixed and then poured into the polypropylene circular molds and polymerized as described in Example 6.

The hydrogel lens was clear, flexible, elastic and had a water content of 67.5%.

The hydrogel had Young's modulus of $6.16 \times 10^6$ dynes/cm$^2$ and ultimate tensile strength of $9.07 \times 10^6$ dynes/cm$^2$.

EXAMPLE 8

25.2 parts N-vinyl-2-pyrrolidone, 12.8 parts (5-methyl-5-m-dioxanyl)methyl methacrylate, 2 parts HEMA, 0.16 parts 3,3'-ethylidene bis(N-vinyl-2-pyrrolidone), 0.12 parts neopentyl glycol dimethacrylate, 0.012 parts t-butyl peroxy neodecanoate, 0.012 parts t-butyl peroctoate and 0.032 parts t-butyl perbenzoate were mixed and then poured into the polypropylene circular molds and polymerized as described in Example 6.

The hydrogel lens was clear, flexible and elastic and had a water content of 68.2%.

The hydrogel had Young's modulus of $6.25 \times 10^6$ dynes/cm$^2$ and ultimate tensile strength of $7.27 \times 10^6$ dynes/cm$^2$.

EXAMPLE 9

24 parts N-vinyl-2-pyrrolidone, 12.8 parts (5-methyl-5-m-dioxanyl)methyl methacrylate, 3.2 parts HEMA, 0.16 parts 3,3'-ethylidene bis(N-vinyl-2-pyrrolidone), 0.12 parts neopentyl glycol dimethacrylate, 0.012 parts t-butyl peroxyneodecanoate, 0.012 parts t-butyl peroctoate and 0.032 parts t-butyl perbenzoate were mixed and then poured into the polypropylene circular molds and polymerized as described in Example 6.

The hydrogel lens was clear, flexible and elastic and had a water content of 60.7%.

The hydrogel had Young's modulus of $11.80 \times 10^6$ dynes/cm$^2$ and ultimate tensile strength of $9.74 \times 10^6$ dynes/cm$^2$.

EXAMPLE 10

18 parts N-vinyl-2-pyrrolidone, 12 parts (5-methyl-5-m-dioxanyl) methyl methacrylate, 0.12 parts, 3,3-ethylidene bis (N-vinyl-2-pyrrolidone), 0.12 parts neopentyl glycol dimethacrylate, 0.009 parts t-butyl peroxyneodecanoate, 0.009 parts t-butyl peroctoate and 0.024 parts t-butyl perbenzoate were mixed and then poured into the polypropylene circular molds and polymerized as described in Example 6.

The hydrogel lens had a water content of 62.3%.

What is claimed is:

1. A contact lens comprised of an interpenetrating network polymer comprising
    (a) hydrophilic vinyl pyrrolidone, 50–80% by weight;
    (b) a first crosslinking agent having an affinity for hydrophilic vinyl pyrrolidone, 0.1–1.0% by weight; said first crosslinking agent being 3,3'-ethylidine-bis (N-vinyl-2-pyrrolidone), diallyl itaconate, diallyl maleate, diallyl fumarate, dimethallyl fumarate, dimethallyl maleate, diallyl diglycollate, diethylene glycol bis (allyl carbonate), diallyl oxalate, diallyl adipate, diallyl succinate, diallyl azelate, divinyl benzene, divinyl adipate, or divinylethers;
    (c) (5-alkylene-m-dioxanyl)acrylic ester, 10–45% by weight, having the formula

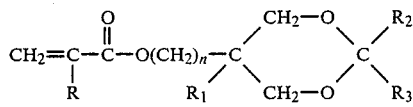

wherein
    R and $R_1$ are independently H or $C_1$–$C_4$ alkyl,
    $R_2$ and $R_3$ are independently H, $C_1$–$C_4$ alkyl, or phenyl, and
    n is an integer from 1–4;
    (d) hydroxyalkyl acrylic ester, 0–20% by weight;
    (e) a second crosslinking agent having an affinity for acrylic esters of (c) and (d), 0.1–2% by weight, said agent being neopentyl glycol dimethacrylate, ethylene glycol dimethacrylate, polyethylene glycol dimethacrylate, 1,6-hexane diol dimethacrylate, glycerol trimethacrylate, pentaerythritol trimethacrylate, pentaerythritol tetramethacrylate, trimethylol propane trimethyacrylate, allylmethacrylate, or corresponding acrylates.

2. A contact lens of claim 1 wherein
    (a) is N-vinyl-2-pyrrolidone;
    (c) has the formula wherein
        R is methyl,
        n is 1,
        $R_1$ is methyl,
        $R_2$ and $R_3$ are H, being (5-methyl-5-m-dioxanyl)-methyl methacrylate; and
    (d) is 2-hydroxyethyl methacrylate.

3. A contact lens of claim 2 wherein (b) is 3,3'-ethylene-bis (N-vinyl-2-pyrrolidine) and (e) is neopentyl glycol dimethacrylate.

4. A contact lens comprised of an interpenetrating network polymer comprising
    (a) N-vinyl-2-pyrrolidone, 50–65%;
    (b) 3,3'-ethylene-bis (N-vinyl-2-pyrrolidine), 0.3–0.5%;
    (c) (5-methyl-5-m-dioxanyl)methyl methacylate, 30–33%;
    (d) 2-hydroxyethyl methacrylate, 5–8%; and
    (e) neopentyl glycol dimethacrylate 0.1–2.0%;
    wherein the percentages are by weight based on the total weight of monomer exclusive of crosslinking agents.

5. A contact lens comprised of an interpenetrating network polymer comprised of 50–80% of a first network comprised of N-vinyl-2-pyrrolidone crosslinked with 0.1–1.0% by weight, 3,3'-ethylidene-bis (N-vinyl-2-pyrrolidone), diallyl itaconate, diallyl maleate, diallyl fumarate, dimethallyl fumarate, dimethallyl maleate, diallyl diglycollate, diethylene glycol bis (allyl carbonate), diallyl oxalate, diallyl adipate, diallyl succinate, diallyl azelate, divinyl benzene, divinyl adipate, or divinylethers, and the balance a second network comprised of 2-hydroxyethyl methacrylate, 0–20% by weight and (5-methyl-5-m-dioxanyl)methyl methacrylate, 10–45% by weight, crosslinked with 0.1–2% neopentyl glycol dimethacrylate, ethylene glycol dimethacrylate, polyethylene glycol dimethacrylate, 1,6-hexane diol dimethacrylate, glycerol trimethacrylate, pentaerythritol trimethacrylate, pentaerythritol tetramethacrylate, trimethylol propane trimethyacrylate, allylmethacrylate, or corresponding acrylates; wherein the percentages are by weight based on the total weight of monomer exclusive of crosslinking agents.

6. A contact lens of claim 5 wherein the first network has been crosslinked with 3,3'ethylidene bis (N-vinyl-2-pyrrolidone) and the second network has been crosslinked with neopentyl glycol dimethacylate.

* * * * *